United States Patent [19]

Magnolato

[11] 4,278,696

[45] Jul. 14, 1981

[54] DEACIDIFYING COFFEE EXTRACT WITH CHITOSAN

[75] Inventor: Danièle Magnolato, Chardonne, Switzerland

[73] Assignee: Societe d'Assistance Technique pour Produits Nestle S.A., Lausanne, Switzerland

[21] Appl. No.: 69,712

[22] Filed: Aug. 27, 1979

[30] Foreign Application Priority Data

Sep. 14, 1978 [CH] Switzerland .......................... 9638/78

[51] Int. Cl.³ .............................................. A23F 5/18
[52] U.S. Cl. .................................... 426/422; 426/387; 426/271
[58] Field of Search .................... 427/271, 422, 387

[56] References Cited

U.S. PATENT DOCUMENTS 4,160,042  7/1979  Farr et al. ........................ 426/422 X

FOREIGN PATENT DOCUMENTS 865052  3/1971  Canada .

OTHER PUBLICATIONS

Muzzarelli, Natural Chelating Polymers, 1973, Pergamon Press: New York, pp. 145, 150, 151, 168.
Sivetz, Coffee-Origin and Lese, 1973, Coffee Publications: Corwallis, OR. Chapter 8, p. 27.

*Primary Examiner*—Joseph M. Golian
*Attorney, Agent, or Firm*—Watson, Leavenworth, Kelton & Taggart

[57] ABSTRACT

The invention relates to a process for deacidifying a coffee extract without the introduction of foreign products by selective absorption with a natural material, chitosan. In this process, the extract is contacted with chitosan in divided form and the deacidified extract is collected after separation from the chitosan. Preferably the coffee extract is contacted with chitosan for 5 to 30 minutes at a temperature from 10° to 80° C. and in ratios (extract/chitosan) of from 15 to 400 ml per gram. The chitosan may either be suspended in the coffee extract, or the coffee extract may be percolated through a column filled with chitosan.

6 Claims, No Drawings

DEACIDIFYING COFFEE EXTRACT WITH CHITOSAN

This invention relates to the treatment of coffee extracts for reducing their content of acid substances which are sometimes considered to be undesiable, for example for reasons of taste associated with certain consumption habits or, more commonly, for physiological reasons.

One method which immediately comes to mind for deacidifying coffee extracts comprises chemically neutralising them by the addition of a food-grade alkaline agent, such as caustic soda or potash and certain carbonates and bicarbonates. However, it will readily be appreciated that this procedure cannot be applied where it is desired to preserve the "natural" image of the extracts in question. In addition, on a more technical plane, there is a considerable increase in the saline charge.

The present invention does not have any of these disadvantages. It relates to a process for deacidifying a coffee extract without the introduction of foreign products by selective absorption with a natural material, namely chitosan. Thus, the present invention provides a process for deacidifying a coffee extract which comprises contacting the coffee extract with chitosan in divided form and collecting the deacidified coffee extract after separation from the chitosan.

Chitosan in the strict sense is a natural polyglucosamine of fungal origin which is also encountered in abundance in the shells of crustaceans and numerous insects in the form of chitin (acetyl chitosan). In general, commercial chitosan is the deacetylation product of chitin in which from 10 to 30% of the amino groups are normally still in acetylated form.

In the broad sense, with which the invention is concerned, the term "chitosan" also covers the natural products or the products of natural origin which are closely related thereto and which may be chemically defined as polysaccharides containing free amine groups. By way of illustration, reference may be made to the constituents of the cell walls of gram-positive bacteria, for example *Bacillus subtilis*.

This chitosan, which may be obtained in the form of powder or flakes, may be used as such for deacidification, although it is generally preferred to subject it to a preliminary purification treatment. A treatment such as this may comprise in particular washing the chitosan with alcohol, for example with 35% aqueous isopropanol. If necessary, the chitosan may also be deodorised by stripping with steam, particularly in an alkaline medium, to remove the unpleasant odoriferous residues.

The coffee extract and the chitosan may be brought into contact in different ways. For example, the extract may be percolated through a column of chitosan, in which case the deacidified coffee extract is directly recovered at the foot of the column. It is also possible to suspend the chitosan in the coffee extract, in which case means have to be provided for separating the chitosan from the extract, which may be done very easily by siphoning after decantation or by filtration.

The contact time between the chitosan and the coffee extract and various other parameters, such as the temperature at which this contact takes place and the proportions of chitosan relative to the extract, depend both on the required level of the acidification and also on the methods used. Generally, contact times of the order of 5 to 30 minutes for temperatures in the range from 10° to 80° C. are satisfactory. It is of advantage to use extract/chitosan proportions of from 15 to 400 ml/g.

For its part, the coffee extract may contain from 1 to 50% and preferably from 12 to 25% by weight of soluble substances. This extract may have been freed beforehand from its aromas by stripping with steam, the aromas being separately collected for subsequent re-introduction.

It has been found that chitosan is a highly selective absorbent for acid substances and that the losses of solids are always minimal. Between the untreated extract and the deacidified extract, there are reductions in solids of from 2 to 2.5%, which is compatible with the quantities of acids present in the extract before treatment. It should be noted that the caffeine content is not affected.

The deacidification level may be freely selected in dependence upon the parameters referred to above. Levels of from 10 to 95% may readily be reached which, by comparison with the starting coffee extract, corresponds to increases in pH of from 0.3 to 1.4 units. By way of illustration where coffee extracts having a dry matter content of the order of 13% are treated at ambient temperature, a relative proportion of 1 gram of chitosan for 40 ml of extract enables 85% of the acids to be eliminated and corresponds to an increase in pH of 1.3 units. Similarly, a relative proportion of 1 g of chitosan for 100 ml of extract increases the pH of the extract by about 1 unit, which corresponds to a deacidification of the order of 70%.

The acid which is predominantly encountered in coffee extracts is chlorogenic acid and it is this acid which is essentially retained by the chitosan. Other acids, such as oxalic acid, citric acid, fumaric acid, malic acid, pyruvic acid, quinic acid and caffeic acid, are also present in coffee extracts and their contents therein are reduced.

Although chitosan is an abundantly available material, it is preferably recycled once it has been used. It has been found that the chitosan may be recycled between 30 and 50 times without any significant loss of activity.

It is of course advisable to regenerate the chitosan i.e. to free it from the substances which it has absorbed, before it is re-used. This may be done very easily by bringing the chitosan into contact with an alkaline solution, followed by rinsing with water until the chitosan shows its natural pH. The chitosan thus regenerated may be directly used for another treatment without any need to subject it to the preliminary treatments mentioned above in reference to the fresh chitosan.

In a first preferred embodiment of the process according to the invention, regenerated chitosan from a preceding deacidification cycle or even fresh chitosan washed beforehand with aqueous isopropanol and deodorised by stripping with steam is suspended in a coffee extract having a dry matter content of from 10 to 25%. The extract/chitosan proportions are between 20 and 250 ml/g and the working temperature is around ambient temperature. After a time interval of from 10 to 30 minutes, during which the suspension is continuously stirred, the solids are separated from the liquid by filtration and the deacidified extract thus recovered. The chitosan is then resuspended in water for rinsing purposes and, after separation, the rinsing waters are combined with the deacidified extract. The mixture obtained is then treated by the methods normally used for the production of coffee, particularly soluble coffee powder.

A second preferred embodiment is characterised by the use of beds of chitosan accommodated in columns through which the coffee extract is percolated. The deacidified extract is thus directly recovered. Extract/chitosan ratios of from 30 to 400 ml/g are preferably used. The chitosan used must have a fairly loose structure, in addition to which it is important not to use the chitosan in the form of an excessively fine powder, otherwise the columns would rapidly become blocked.

On completion of the operations described for either embodiment, the chitosan is regenerated by alkaline treatment, followed by rinsing with soft water. It may then be used for another absorption cycle.

The quality of the extracts obtained is not impaired by the treatment with chitosan, quite the opposite. Neither the intensity nor the aromatic balance of the extracts in question is affected. On the other hand, in the opinion of tasters who prefer only slightly acid coffee, the treatment is regarded as distinctly beneficial.

The process according to the invention is illustrated by the following Examples. The operations by which the chitosan is prepared and regenerated are described first of all, although they do not form an integral part of the process according to the invention, being either optional or merely inherent in the large-scale working of the process according to the invention.

EXAMPLES

Preparation of the chitosan 1 kg of commercial chitosan powder (chitosan from crabs, Biosynth AG, particles 0.5 to 2 mm in diameter) is suspended in 33 liters of 55% aqueous isopropanol and the resulting suspension stirred for 30 minutes at ambient temperature. The suspension is then centrifuged to recover on the one hand 31.5 liters of aqueous isopropanol which will be recycled and, on the other hand, the washed chitosan. If the chitosan still shows traces of odour, it is suspended in 9.9 liters of 0.1 N KOH and the resulting suspension is treated by stripping with steam for 1 hour. The solution of KOH is separated from the chitosan by centrifuging and recycled. The chitosan is washed with hot water (90° C.), centrifuged and dried in hot air (80° C.).

Regeneration of the chitosan 1 kg of "spent" chitosan, i.e. chitosan which has been used as an absorbent, is suspended in 10 kg of a 1/1 mixture of isopropanol and 1 N KOH, and the resulting suspension stirred for 15 minutes at ambient temperature. The suspension is then centrifuged to recover on the one hand 9 kg of the liquid phase and, on the other hand, the chitosan. The chitosan is then washed with hot water (80° to 90° C.) until the washing waters are neutral, followed by drying in vacuo at 80° C.

If necessary, the regeneration treatment may be completed at the washing stage, the chitosan being suspended in the water, by stripping with steam for 1 hour. In this way, a little isopropanol is additionally recovered. The regenerated chitosan is dried in the same way as before.

By way of illustration, a comparison is made between the effect of one batch of fresh washed chitosan and the effect of three batches of regenerated chitosan suspended in coffee extract having a dry matter content of 13% (2.5 g of chitosan for 100 ml of extract). A remarkable homogeneity is observed because, for the four batches, the pH of the extract passes from 4.80 to 6.30, which corresponds to a deacidification level of the order of 85%.

At the same time, another test is carried out to compare the effects of the same batch of chitosan after successive regenerations, the chitosan being suspended in the above coffee extract in a quantity of 5 kg for 250 ml of extract. A remarkable constancy in the deacidification level (around 70%) is observed, even after 15 successive regenerations. In other words, the chitosan may be repeatedly recycled.

EXAMPLES 1 TO 16

Fresh or regenerated chitosan is suspended in a coffee extract in accordance with the particulars shown in the following Table, and the resulting suspension stirred for 30 minutes at ambient temperature. The phases are then separated by centrifuging and the liquid phase set aside. The chitosan is then resuspended in water and the resulting suspension stirred for 15 minutes at ambient temperature before centrifuging. The liquid phase collected is added to the first liquid phase, the resulting mixture forming the deacified extract. For its part, the chitosan is regenerated.

In accordance with the standard procedure for producing soluble coffee, the deacidified extract is concentrated. The aromas are added to the concentrate if these were removed from the starting extract by steam stripping prior to contact with the chitosan. The concentrate is then converted into powder by drying.

| Example No. | % dry matter | vol. of extract ml | weight of chitosan g | pH of the extracts before | pH of the extracts after | % deacidification |
|---|---|---|---|---|---|---|
| 1 | 13 | 100 | 1.0 | 4.95 | 5.95 | 70 |
| 2 | 13 | 150 | 1.0 | 4.95 | 5.70 | 61 |
| 3 | 13 | 200 | 1.0 | 4.95 | 5.50 | 46 |
| 4 | 13 | 250 | 1.0 | 4.95 | 5.40 | 38 |
| 5 | 5 | 100 | 0.77 | 5.10 | 6.10 | 66 |
| 6 | 10 | 100 | 1.54 | 5.10 | 6.10 | 66 |
| 7 | 15 | 100 | 2.31 | 5.10 | 6.10 | 66 |
| 8 | 20 | 100 | 3.08 | 5.10 | 6.10 | 66 |
| 9 | 25 | 100 | 3.85 | 5.10 | 6.10 | 66 |
| 10 | 30 | 100 | 4.62 | 5.10 | 6.10 | 66 |
| 11 | 5 | 100 | 2.0 | 5.10 | 6.50 | 81 |
| 12 | 10 | 100 | 2.0 | 5.10 | 6.30 | 74 |
| 13 | 15 | 100 | 2.0 | 5.10 | 6.15 | 69 |
| 14 | 20 | 100 | 2.0 | 5.10 | 6.08 | 63 |
| 15 | 25 | 100 | 2.0 | 5.10 | 6.00 | 60 |
| 16 | 30 | 100 | 2.0 | 5.10 | 5.90 | 54 |

EXAMPLES 17 TO 20

Chitosan is arranged in a column and a coffee extract having a dry matter content of 13% is percolated therethrough in accordance with the particulars shown in the following Table, the deacidified extract simply being collected at the foot of the column. The results obtained are also shown in this Table.

| Example No. | Vol. of extract ml | Weight of chitosan g | pH of the extracts before | pH of the extracts after | % deacidification |
|---|---|---|---|---|---|
| 17 | 1000 | 25 | 4.75 | 6.20 | 83 |
| 18 | 50 | 1.0 | 4.80 | 6.00 | 77 |
| 19 | 100 | 1.0 | 4.80 | 5.80 | 69 |
| 20 | 500 | 2.5 | 5.00 | 5.50 | 44 |

The deacidified coffee extracts may be converted into instant coffees as indicated above.

After reconstitution, samples of these coffees and those of Examples 1 to 16 are presented for tasting to people having a preference for only slightly acid coffee. A distinct preference is declared for the coffees having a pH of from 5.5 to 5.7 and 5.9, corresponding to a deacification with the chitosan ranging from 45–55% to 70% in round figures.

I claim:

1. A process for deacidifying a coffee extract which comprises contacting the coffee extract with chitosan in divided form and collecting the deacidified coffee extract after separation from the chitosan, wherein the caffeine content of the coffee extract is not affected by contact with the chitosan.

2. A process as claimed in claim 1, wherein the coffee extract is contacted with the chitosan for 5 to 30 minutes.

3. A process as claimed in claim 1, wherein the coffee extract is contacted with the chitosan at a temperature in the range from 10° to 80° C.

4. A process as claimed in claim 1, wherein the coffee extract and the chitosan are contacted in proportions (extract/chitosan) of from 15 to 400 ml per gram.

5. A process as claimed in claim 1, wherein the deacidified coffee extract has a pH value higher by 0.3 to 1.4 units than the pH value of the extract before contact with the chitosan.

6. A process as claimed in claims 1, 2, or 3, wherein before contact with the chitosan aromas are stripped from the coffee extract.

* * * * *